United States Patent
Yu et al.

(10) Patent No.: US 10,643,124 B2
(45) Date of Patent: May 5, 2020

(54) METHOD AND DEVICE FOR QUANTIZING COMPLEX ARTIFICIAL NEURAL NETWORK

(71) Applicant: Deephi Technology Co., Ltd., Beijing (CN)

(72) Inventors: Jincheng Yu, Beijing (CN); Song Yao, Beijing (CN)

(73) Assignee: BEIJING DEEPHI INTELLIGENT TECHNOLOGY CO., LTD., Beijing (CN)

( * ) Notice: Subject to any disclaimer, the term of this patent is extended or adjusted under 35 U.S.C. 154(b) by 912 days.

(21) Appl. No.: 15/252,220

(22) Filed: Aug. 31, 2016

(65) Prior Publication Data

US 2018/0046896 A1    Feb. 15, 2018

Related U.S. Application Data

(63) Continuation-in-part of application No. 15/242,622, filed on Aug. 22, 2016, now Pat. No. 10,621,486, and (Continued)

(30) Foreign Application Priority Data

Aug. 12, 2016 (CN) .......................... 2016 1 0663201
Aug. 12, 2016 (CN) .......................... 2016 1 0663563

(51) Int. Cl.
*G06N 3/06* (2006.01)
*G06N 3/063* (2006.01)
*G06N 3/04* (2006.01)

(52) U.S. Cl.
CPC ........... *G06N 3/063* (2013.01); *G06N 3/0454* (2013.01)

(58) Field of Classification Search
CPC .. G06K 9/0061; G06K 9/00617; G06K 9/036; G06K 9/4628; G06K 9/4652;
(Continued)

(56) References Cited

U.S. PATENT DOCUMENTS 9,317,482 B2    4/2016   Davis et al.
2017/0076195 A1*  3/2017  Yang ...................... G06N 3/063
(Continued)

FOREIGN PATENT DOCUMENTS

CN    102129397 A    7/2011
CN    104915322 A    9/2015
(Continued)

OTHER PUBLICATIONS

Szegedy et al., "Going deeper with convolutions", In CVPR, 2015, pp. 1-9 (Year: 2015).*
(Continued)

*Primary Examiner* — Paulinho E Smith
(74) *Attorney, Agent, or Firm* — IPro, PLLC

(57) ABSTRACT

Systems, apparatus and methods are provided for accelerating a complex neural network by fixed-point data quantization. An Artificial Neural Network (ANN) has branches and comprises convolutional layers CONV 1, CONV 2, . . . CONV n, fully connected layers FC 1, FC 2, . . . , FC m, and concatenation layers CONCAT1, CONCAT2, . . . , CONCAT L. n, m and L are positive integers. The ANN may be optimized by a method comprising: converting output of each of the CONV, FC and CONCAT layers into fixed-point numbers, identifying at least one sub-network from the ANN and for each sub-network, modifying the fixed-point range of each output of the previous-level layers of the CONCAT layer on the basis of the fixed-point range of the CONCAT layer. The sub-network has a CONCAT layer as its output. The CONCAT layer receives at least two outputs of previ-
(Continued)

ous-level layers as inputs and concatenates the inputs into one output.

25 Claims, 11 Drawing Sheets

Related U.S. Application Data a continuation-in-part of application No. 15/242,624, filed on Aug. 22, 2016.

(58) Field of Classification Search
CPC ...... G06K 9/627; G06N 3/0454; G06N 3/063; G06T 2207/20081; G06T 2207/20082; G06T 7/10; G06T 7/11; G06T 7/12
See application file for complete search history.

(56) References Cited

U.S. PATENT DOCUMENTS

| | | | |
|---|---|---|---|
| 2017/0243085 A1* | 8/2017 | Vanhoucke | G06K 9/6267 |
| 2017/0316286 A1* | 11/2017 | Szegedy | G06K 9/66 |
| 2018/0046894 A1* | 2/2018 | Yao | G06F 7/483 |
| 2018/0046896 A1* | 2/2018 | Yu | G06N 3/0454 |
| 2018/0046903 A1* | 2/2018 | Yao | G06N 3/0481 |
| 2018/0046905 A1* | 2/2018 | Li | G06N 3/0454 |
| 2018/0046913 A1* | 2/2018 | Yu | G06F 13/28 |
| 2018/0068207 A1* | 3/2018 | Szegedy | G06K 9/66 |
| 2018/0089834 A1* | 3/2018 | Spizhevoy | G06T 7/10 |
| 2019/0034784 A1* | 1/2019 | Li | G06N 3/0445 |
| 2019/0034796 A1* | 1/2019 | Li | G06N 3/08 |

FOREIGN PATENT DOCUMENTS

| | | |
|---|---|---|
| CN | 105488565 A | 4/2016 |
| CN | 205139973 U | 4/2016 |
| CN | 105681628 A | 6/2016 |
| CN | 105760933 A | 7/2016 |

OTHER PUBLICATIONS

Qui et al., "Going Deeper with Embedded FPGA Platform for Convolutional Neural Network", Feb. 21-23, 2016, FPGA 2016, pp. 26-35 (Year: 2016).*
A Massively Parallel Coprocessor for Convolutional Neural Networks, DOI: 10.1109/ASAP.2009.25.
NeuFlow: Dataflow vision processing system-on-a-chip, DOI: 10.1109/MWSCAS.2012.6292202.
Going Deeper with Embedded FPGA Platform for Convolutional Neural Network, DOI: 10.1145/2847263.2847265.
1. Image-Net Large-Scale Vision Recognition Challenge (ILSVRC) 2012.
15. Long short-term memory recurrent neural network architectures for large scale acoustic modeling[C]// Interspeech. 2014: 338-342.
16. Long short-term memory based recurrent neural network architectures for large vocabulary speech recognition[J]. arXiv preprint arXiv:1402.1128, 2014.
23. DSD: Regularizing Deep Neural Networks with Dense-Sparse-Dense Training Flow in NIPS 2016.
Learning both Weights and Connections for Efficient Neural Networks, arXiv:1506.02626v3 [cs.NE] Oct. 30, 2015.
8. DSD: Regularizing Deep Neural Networks with Dense-Sparse-Dense Training Flow in NIPS 2016.
9. Long Short-term Memory, Neural Computation 9(8):1735-80 • Dec. 1997, DOI: 10.1162/neco.1997.9.8.1735.

* cited by examiner

METHOD AND DEVICE FOR QUANTIZING COMPLEX ARTIFICIAL NEURAL NETWORK

CROSS REFERENCE TO RELATED APPLICATIONS

This application claims priority to Chinese Patent Application Number 201610663201.9 filed on Aug. 12, 2016 and Chinese Patent Application Number 201610663563.8 filed on Aug. 12, 2016, U.S. application Ser. No. 15/242,622 filed on Aug. 22, 2016, U.S. application Ser. No. 15/242,624 filed on Aug. 22, 2016, the entire content of which are incorporated herein by reference.

TECHNICAL FIELD

The present invention relates to artificial neural network, for example, convolutional neural network. In particular, the present invention relates to how to accelerate a complex neural network by fixed-point data quantization.

BACKGROUND ART

Artificial neural network (ANN), in particular, convolutional neural network (CNN) has achieved great success in various fields. For example, in the field of computer vision (CV), CNN is widely used and most promising.

Image classification is a basic problem in computer vision (CV). In recent years, Convolutional Neural Network (CNN) has led to great advances in image classification accuracy. In Image-Net Large- Scale Vision Recognition Challenge (ILSVRC) 2012, Krizhevsky et al. showed that CNN had great power by achieving the top-5 accuracy of 84.7% in classification task, which was significantly higher than other traditional image classification methods. In the following years, the accuracy has been improved to 88.8%, 93.3%, and 96.4% in ILSVRC 2013, 2014, and 2015.

While achieving state-of-the-art performance, CNN-based methods demand much more computations and memory resources compared with traditional methods. In this manner, most CNN-based methods have to depend on large servers. However, there has been a non-negligible market for embedded systems which demands capabilities of high-accuracy and real-time object recognition, such as auto-piloted car and robots. But for embedded systems, the limited battery and resources are serious problems.

CNN is widely used in imaging processing. The advantages of CNN-based approach is that it is easy to train a CNN and CNN has a relatively simple computational structure. However, it is also known that CNN-based approach is both operational-intensive and memory-intensive. The existing CNNs commonly use 32-bit or 64-bit floating-number system. Given the fact that there are lots of redundant data in a CNN, it has been proposed to convert CNN into relatively short fixed-point numbers without substantial loss of accuracy.

In the previously filed patent applications, the inventor proposes a method and system to quantizing CNN into a fixed-point representation. For example, it proposes how to quantize a simple CNN (which has no complex sub-network/branches) layer by layer. Specifically, the proposed solution quantizes a serialized neural network. As shown in FIG. 2, in a serialized neural network, each layer N has only one preceding layer and one subsequent layer. The proposed solution aims to find an optimal fixed-point representation of each layer, starting from the input to the output of the neural network.

The above proposed solution cannot be applied to a complex network, such as GoogLeNet, SqueezeNet, etc., which have merged branches and parallel sub-networks.

SUMMARY

The present invention proposes a solution to quantize a complex neural network. In addition to achieving each layer's optimal quantization, it also considers how to maintain consistency when different layers are merged or concatenated.

According to one aspect of the application, it proposes a method for optimizing an Artificial Neural Network (ANN), said method comprising: (a) fixed-point data quantizing step, for converting output of each layer of said ANN into fixed-point numbers, (b) sub-network identifying step, for identifying at least one sub-network from said ANN, wherein each sub-network has a concatenation layer as its output, wherein said concatenation layer receives at least two outputs of previous-level layers as its inputs and concatenates said inputs into one output; (c) fixed-point modifying step, for each sub-network, modifying the fixed-point range of each output of the previous-level layers of said concatenation layer on the basis of the fixed-point range of said concatenation layer.

According to one aspect of the application, it proposes a method for optimizing an Artificial Neural Network (ANN), said ANN has branches and at least comprises convolutional layers CONV 1, CONV 2, ... CONV n, and fully connected layers FC 1, FC 2, ... , FC m, concatenation layers CONCAT1, CONCAT2, ..., CONCAT 1, wherein n, m and 1 are positive integers, said method comprising: (a) fixed-point data quantizing step, for converting output of each of said CONV, FC and CONCAT layers into fixed-point numbers, (b) CONCAT layer identifying step, for identifying at least one sub-network from said ANN, wherein each sub-network has a CONCAT layer as its output, wherein said CONCAT layer receives at least two outputs of previous-level layers as its inputs and concatenates said inputs into one output; (c) fixed-point modifying step, for each sub-network, modifying the fixed-point range of each output of the previous-level layers of said CONCAT layer on the basis of the fixed-point range of said CONCAT layer.

According to another aspect of the invention, it proposes a device for optimizing an Artificial Neural Network (ANN), said ANN has branches and at least comprises convolutional layers CONV 1, CONV 2, ... CONV n, and fully connected layers FC 1, FC 2, ... , FC m, concatenation layers CONCAT1, CONCAT2, ..., CONCAT 1, wherein n, m and 1 are positive integers, said device comprising: fixed-point data quantizing unit, configured for converting output of each of said CONV, FC and CONCAT layers into fixed-point numbers; CONCAT layer identifying unit, configured for identifying at least one sub-network from said ANN, wherein each sub-network has a CONCAT layer as its output, wherein said CONCAT layer receives at least two outputs of previous-level layers as its inputs and concatenates said inputs into one output; fixed-point modifying unit, configured for, for each sub-network, modifying the fixed-point range of each output of the previous-level layers of said CONCAT layer on the basis of the fixed-point range of said CONCAT layer.

EMBODIMENTS OF THE INVENTION

Some content of the present application has been proposed by the inventor in a previous paper "Going Deeper With Embedded FPGA Platform for Convolutional Neural Network" (FPGA 2016.2). In the present application, the inventor proposes further improvements on the basis of the previous paper.

In order to illustrative the concepts of the present invention, the application explains how CNN is applied in image processing, e.g., image classification/prediction. Other Artificial Neural Network, such as DNN and RNN, can be improved and implemented in a similar manner.

Concepts of CNN

Figure 1:
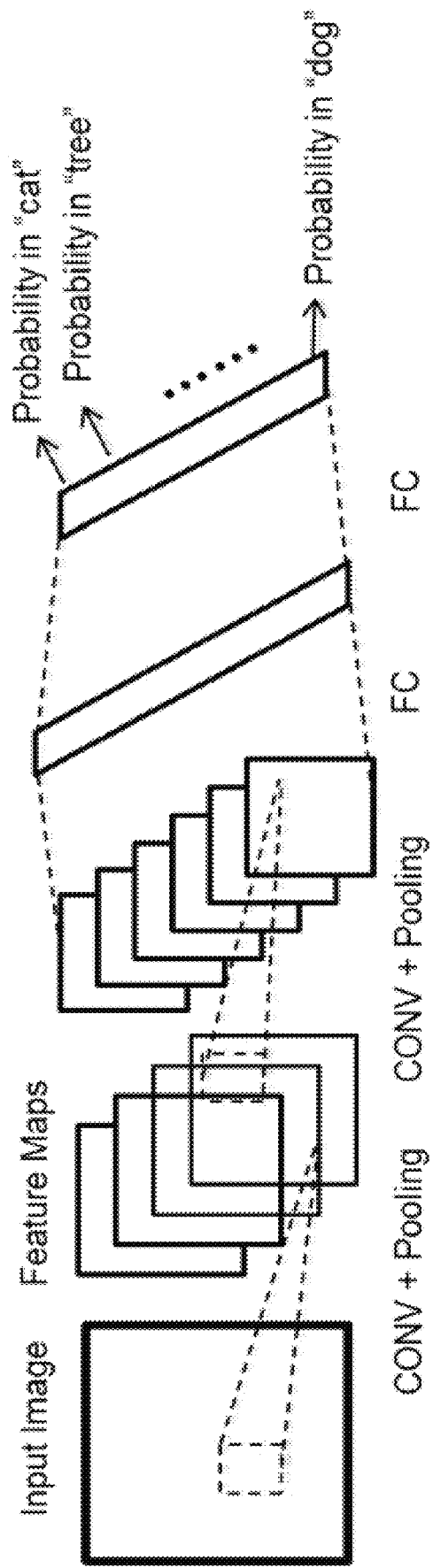
FIG. 1 shows a typical CNN according to the present invention.

As shown in FIG. 1, a typical CNN consists of a number of layers that run in sequence.

The parameters of a CNN model are called "weights". The first layer of a CNN reads an input image and outputs a series of feature maps. The following layers read the feature maps generated by previous layers and output new feature maps. Finally a classifier outputs the probability of each category that the input image might belong to.

CONV layer and FC layer are two essential types of layer in CNN. After CONV layers, there are usually pooling layers.

For a CNN layer, $f_j^{in}$ denotes its j-th input feature map, $f_i^{out}$ denotes the i-th output feature map, and $b_i$ denotes the bias term to the i-th output map.

For CONV layers, $n_{in}$ and $n_{out}$ represent the number of input and output feature maps respectively.

For FC layers, $n_{in}$ and $n_{out}$ are the length of the input and output feature vector.

A CONV layer takes a series of feature maps as input and convolves with convolutional kernels to obtain the output feature map.

A nonlinear layer, which applies nonlinear activation function to each element in the output feature maps is often attached to CONV layers.

The CONV layer can be expressed with Equation 1:

$$f_i^{out} = \sum_{j=1}^{n_{in}} f_j^{in} \otimes g_{i,j} + b_i (1 \leq i \leq n_{out}) \quad (1)$$

where $g_{i,j}$ is the convolutional kernel applied to j-th input feature map and i-th output feature map.

FC layer applies a linear transformation on the input feature vector:

$$f^{out} = Wf^{in} + b \quad (2)$$

where W is an $n_{out} \times n_{in}$ transformation matrix and b is the bias term. It should be noted, for the FC layer, the input is not a combination of several 2-D feature maps but just a feature vector. Consequently, in Equation 2, the parameter $n_{in}$ and $n_{out}$ actually corresponds to the lengths of the input and output feature vector.

Pooling layer, which outputs the maximum or average value of each subarea in each feature maps, is often attached to the CONV layer. Max-pooling can be expressed as Equation 3:

$$f_{i,j}^{out} = \max_{p \times p} \begin{pmatrix} f_{m,n}^{in} & \cdots & f_{m,n+p-1}^{in} \\ \vdots & & \vdots \\ f_{m+p-1,n}^{in} & \cdots & f_{m+p-1,n+p-1}^{in} \end{pmatrix} \quad (3)$$

where p is the pooling kernel size. This non-linear "down sampling" not only reduces the feature map size and the computation for later layers, but also provides a form of translation invariance.

CNN can be used to classify images in a forward inference process. But before using the CNN for any task, one should first train the CNN on a dataset. Recent research showed that, a CNN model pre-trained on a large dataset for a given task can be used for other tasks and achieved high accuracy with minor adjustment in network weights. This minor adjustment is called "fine-tune". The training of the CNN is mostly implemented on large servers. For embedded FPGA platform, we only focus on accelerating the inference process of a CNN.

Figure 2:
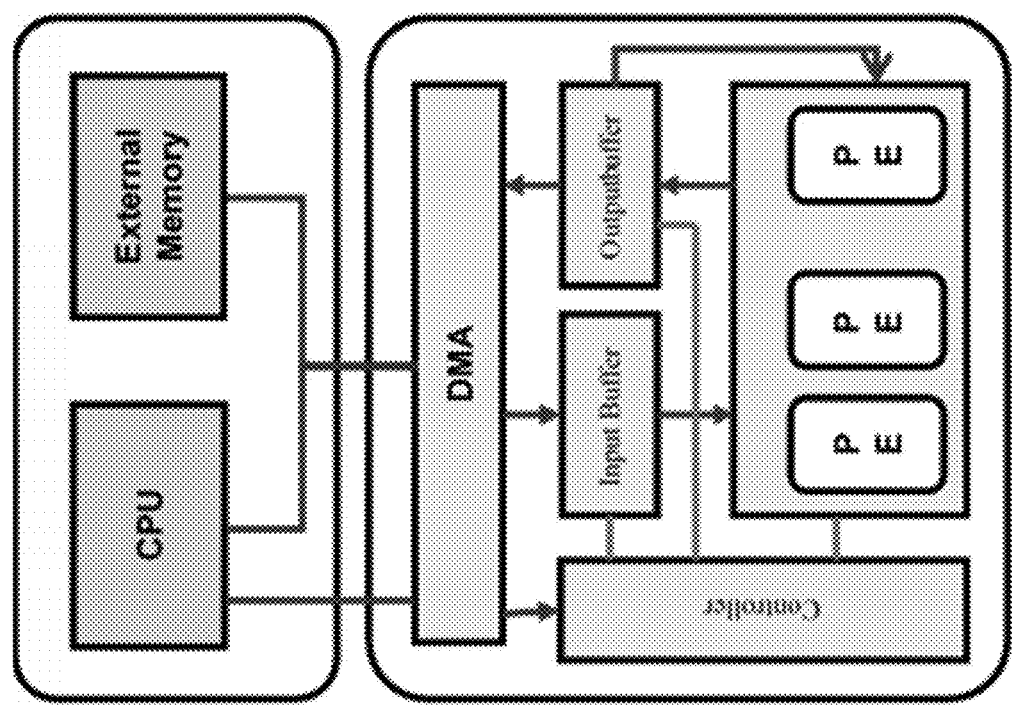
FIG. 2 shows a flow to optimize and implement a CNN from both algorithm and hardware design.
Figure 2:
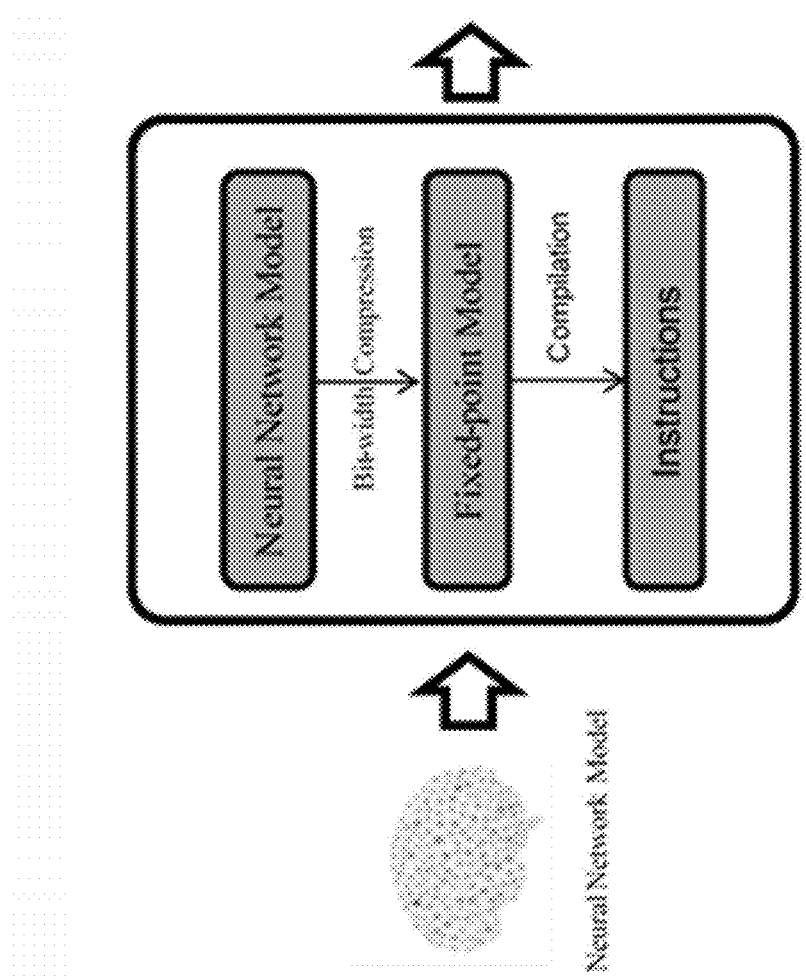

FIG. 2 shows a solution for accelerating CNN from both algorithm optimization and hardware design.

At the left end of FIG. 2, it shows an Artificial Neural Network (ANN), such as a CNN, which is to be optimized and implemented by the present invention. In the middle of FIG. 2, it shows how to optimize a CNN from the algorithm perspective, in order to reduce both memory and computation resources it requires to implement a CNN, while suffer minimum loss of accuracy. In the right end of FIG. 2, it shows how to implement a CNN from a hardware perspective. The optimized CNN is input to the special ANN accelerator and implemented thereon.

Data Quantization for Serialized ANN

Figure 3:
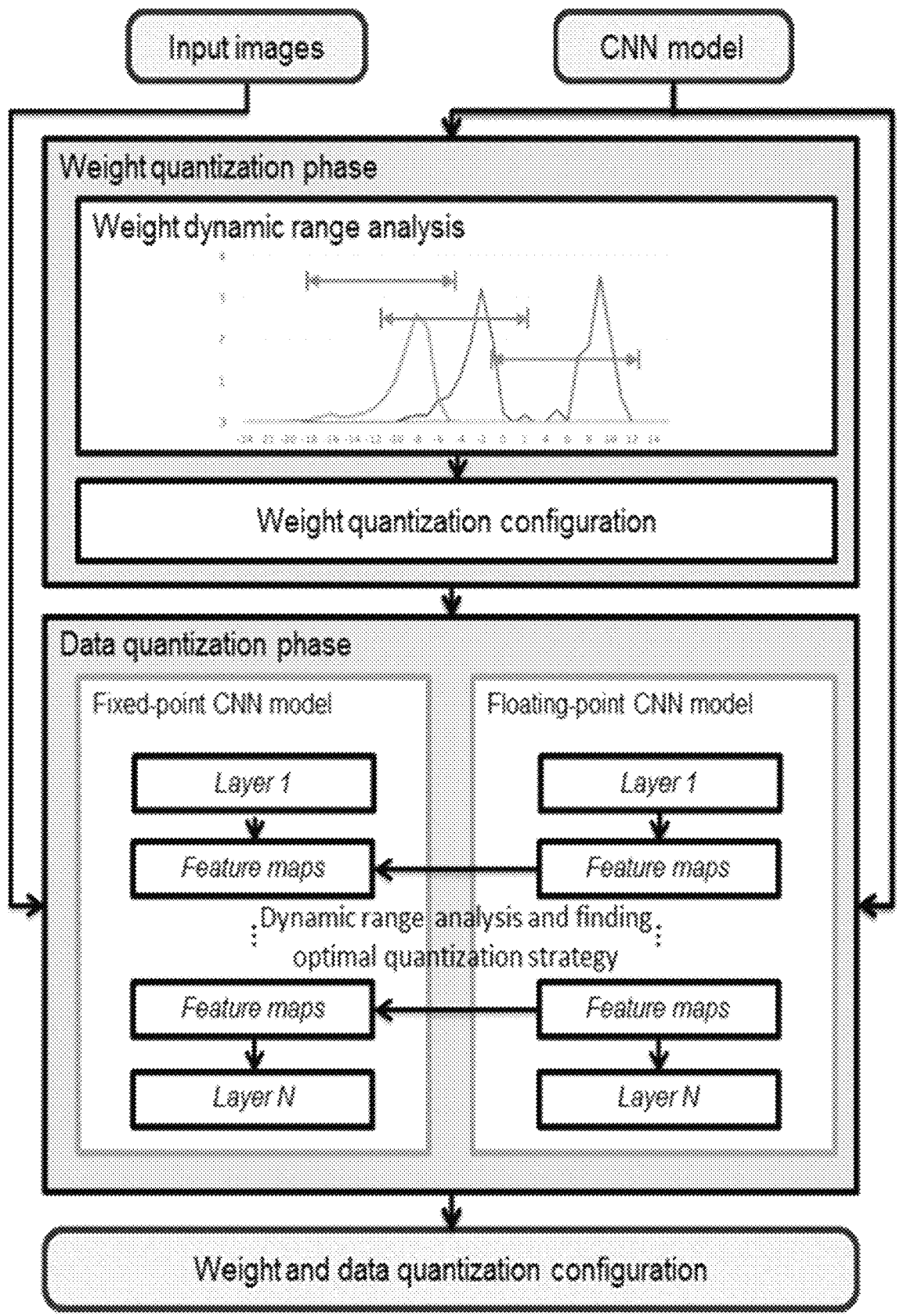
FIG. 3 shows fixed-point quantization process of FIG. 2 in more details.

FIG. 3 shows more details of the quantization step of FIG. 2.

For a fixed-point number, its value can be expressed as $$n = \sum_{i=0}^{bw-1} B_i \cdot 2^{-f_l} \cdot 2^i \quad (4)$$

where bw is the bit width of the number and $f_l$ is the fractional length which can be negative.

In order to convert floating-point numbers into fixed-point ones while achieving the highest accuracy, it proposes a dynamic-precision data quantization strategy and an automatic workflow.

Unlike previous static precision quantization strategies, in the proposed data quantization flow, $f_l$ is dynamic for different layers and feature map sets while static in one layer to minimize the truncation error of each layer.

As shown in FIG. 3, the proposed quantization flow mainly consists of two phases: the weight quantization phase, and the data quantization phase.

The weight quantization phase aims to find the optimal $f_l$ for weights in one layer, as shown in Equation 5:

$$f_l = \underset{f_l}{\operatorname{argmin}} \sum |W_{float} - W(bw, f_l)| \quad (5)$$

where W is a weight and W(bw, $f_l$) represents the fixed-point format of W under the given bw and $f_l$ In one embodiment, the dynamic ranges of weights in each layer is analyzed first, for example, by sampling. After that, the $f_l$ is initialized to avoid data overflow. Furthermore, we search for the optimal $f_l$ in the adjacent domains of the initial $f_l$.

In an alternative embodiment, the optimal $f_l$ is decided based on the following Equation 6.

$$f_l = \underset{f_l}{\operatorname{argmin}} \sum \left| \sum k_i |W_{float_i} - W(bw, f_l)_i| \right| \quad (6)$$

wherein W is the weight matrix of one layer, W (bw, $f_l$) represents the fixed-point format of W under the given bw and $f_l$, i represents one bit of bw bits, ki represents the weight of said bit i.

The data quantization phase aims to find the optimal $f_l$ for the output of a layer. Said output is used as the input of the next layer. In ANN image processing, a benchmark data set is used to train said ANN. said input/output is a set of feature maps between two layers.

In one embodiment, firstly, weight quantization is conducted for ally CONV and FC layers of ANN. Then, in order to conduct data quantization, the benchmark data is input to ANN, and output of each layer is available after said training.

For output of each layer, the intermediate data of the fixed-point CNN model and the floating-point CNN model are compared layer by layer using a greedy algorithm to reduce the accuracy loss. For each layer, the optimization target is shown in Equation 7:

$$f_l = \underset{f_l}{\operatorname{argmin}} \sum |x^+_{float} - x^+(bw, f_l)| \quad (7)$$

In Equation 7, x+ represents the result of a layer when we denote the computation of a layer as $x^+=A \cdot x$. It should be noted, for either CONV layer or FC layer, the direct result $x^+$ has longer bit width than the given standard. Consequently, truncation is needed when optimizing $f_l$ selection. Finally, the entire data quantization configuration is generated.

In an alternative embodiment, we use the following Equation 8 to find $f_l$.

$$f_l = \underset{f_l}{\operatorname{argmin}} \sum \left| \sum_N k_i |X^+_{float_i} - X^+(bw, f_l)_i| \right| \quad (8)$$

wherein $x^+=A \cdot x$, A represents the operation applied by one of the CONV layers and FC layers of the ANN, x represents the input of one layer, x+ represents the output of said layer, i represents one bit out of bw bits, $k_i$ represents the weight of said bit i.

In the above example of data quantization, it finishes weight quantization of all CONV layers and FC layers of the ANN, and then conducts data quantization for each feature map set on the basis of the quantized CONV layers and FC layers.

According to another embodiment of the present invention, it performs weight quantization and data quantization in an alternative (i.e., interleaved) manner. Specifically, for example, it conducts weight quantization for one of said CONV layers and FC layers in sequence; after conducting weight quantization for the present layer, but before conducting weight quantization for next layer of said CONV layers and FC layers, it conducts data quantization of output (i.e., feature map sets) from said present layer.

The above solution is applicable to a simple neural network, such as a completely serialized neural network.

Figure 4:
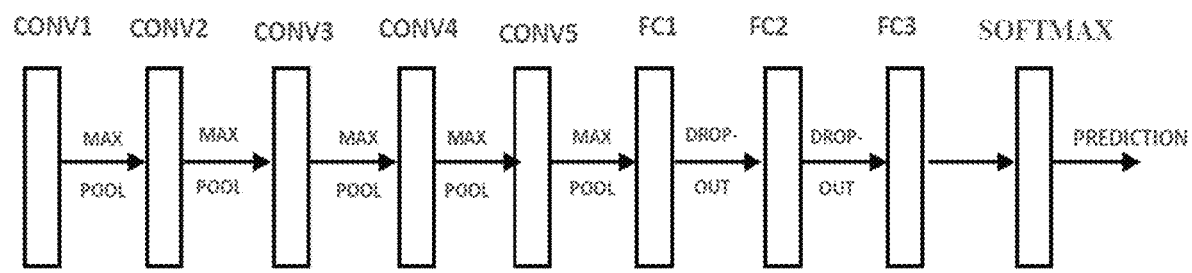
FIG. 4 shows a serialized neural network with CONV layers, FC layers, and also shows output of each layer.

FIG. 4 shows a completely serialized neural network. For any intermediate layer N, it has only one preceding layer (as its input source) and only one subsequent layer (as its output destination). In one embodiment, following the serial connection of the neural network, the proposed solution finds optimal fixed-point numerical range for one layer's data and/or weights, and then goes to the next layer.

Figure 5:
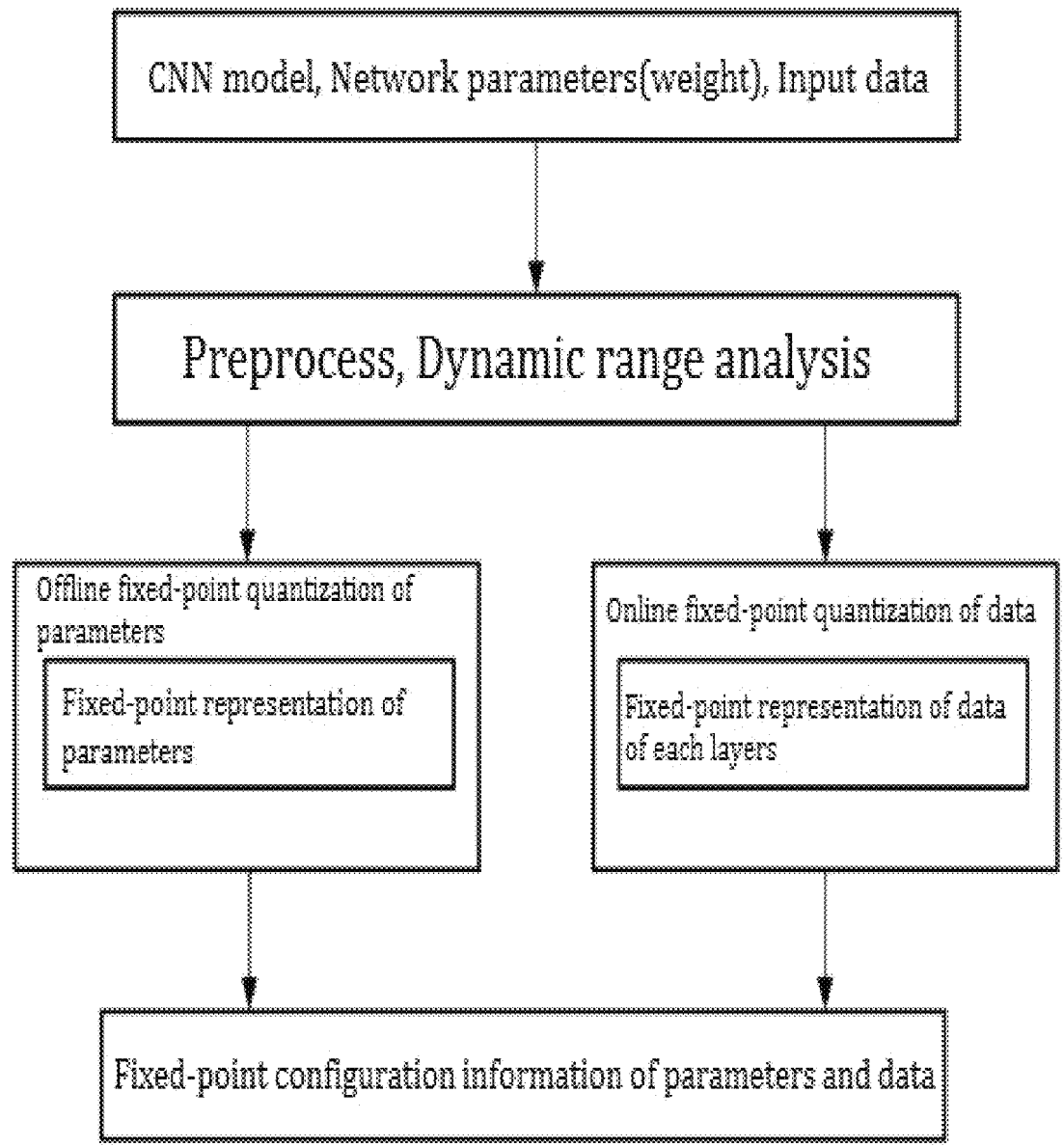
FIG. 5 shows a quantization flow for a serialized neural network.

FIG. 5 shows an overall process of finding an optimal fixed-point range for a simple serialized neural network.

As shown on the left branch of FIG. 5, it conducts weight quantization.

As shown on the right branch of FIG. 5, it conducts data quantization process by "on-line" calculation. "On-line" calculation means that a set of input data (such as sample data set) is input to the neural network, and by running these actual data in the neural network, the intermediate data results are available. On the basis of these intermediate data results, it conducts the data quantization to find the optimal fixed-point range of each layer.

Data Quantization for a Complex Neural Network

The process of FIG. 5 is applicable to a serialized neural network. It quantizes one layer by one layer, following the serial connection of the neural network. Each layer's quantization is dependent upon its preceding layer's quantization.

However, the process of FIG. 5 is difficult to be applied to a complex network, such as GoogLeNet, SqueezeNet, etc., which have merged branches and parallel sub-networks.

Figure 6A:
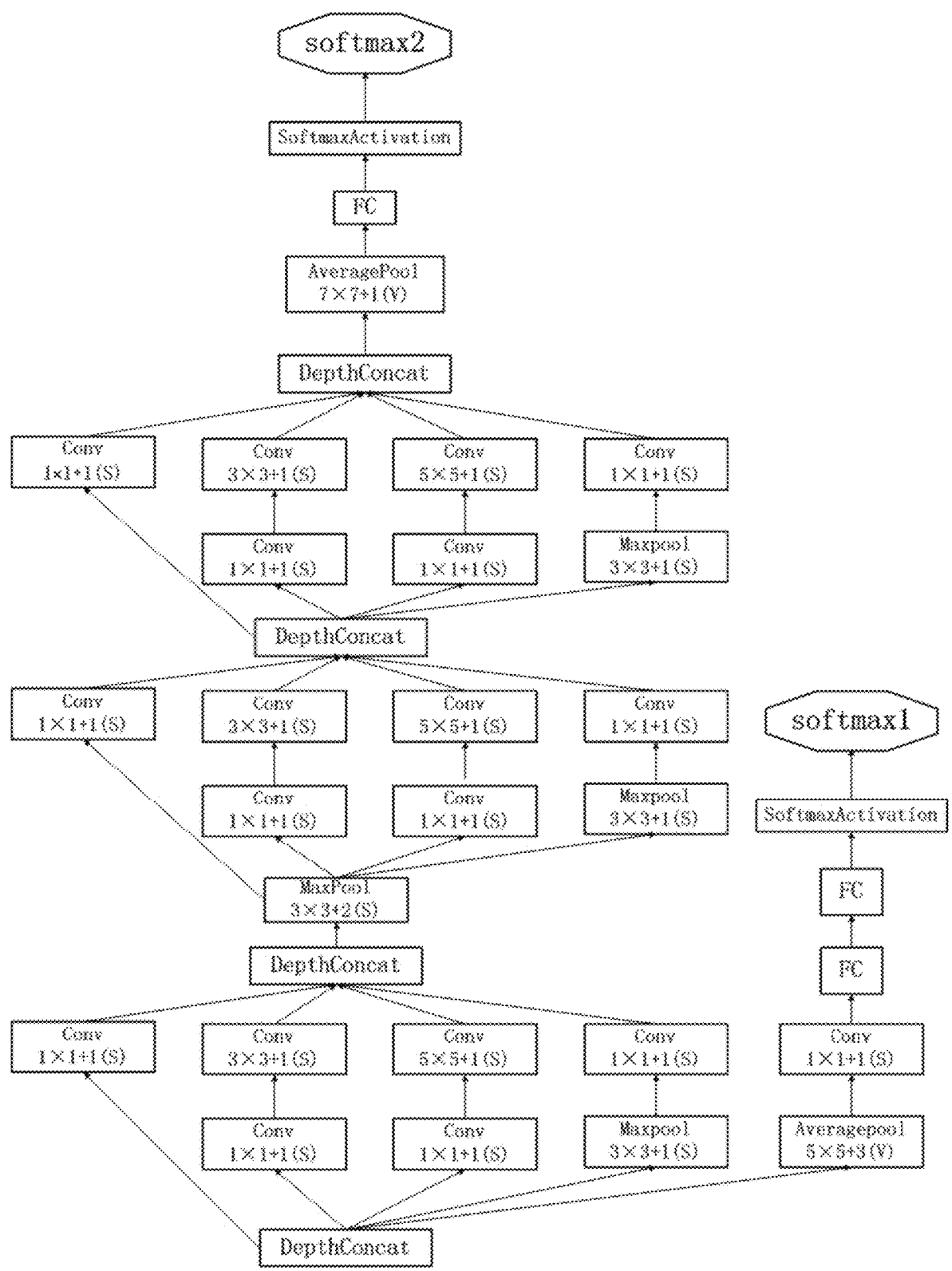
FIG. 6A shows the output side of GoogLeNet.
Figure 6B:
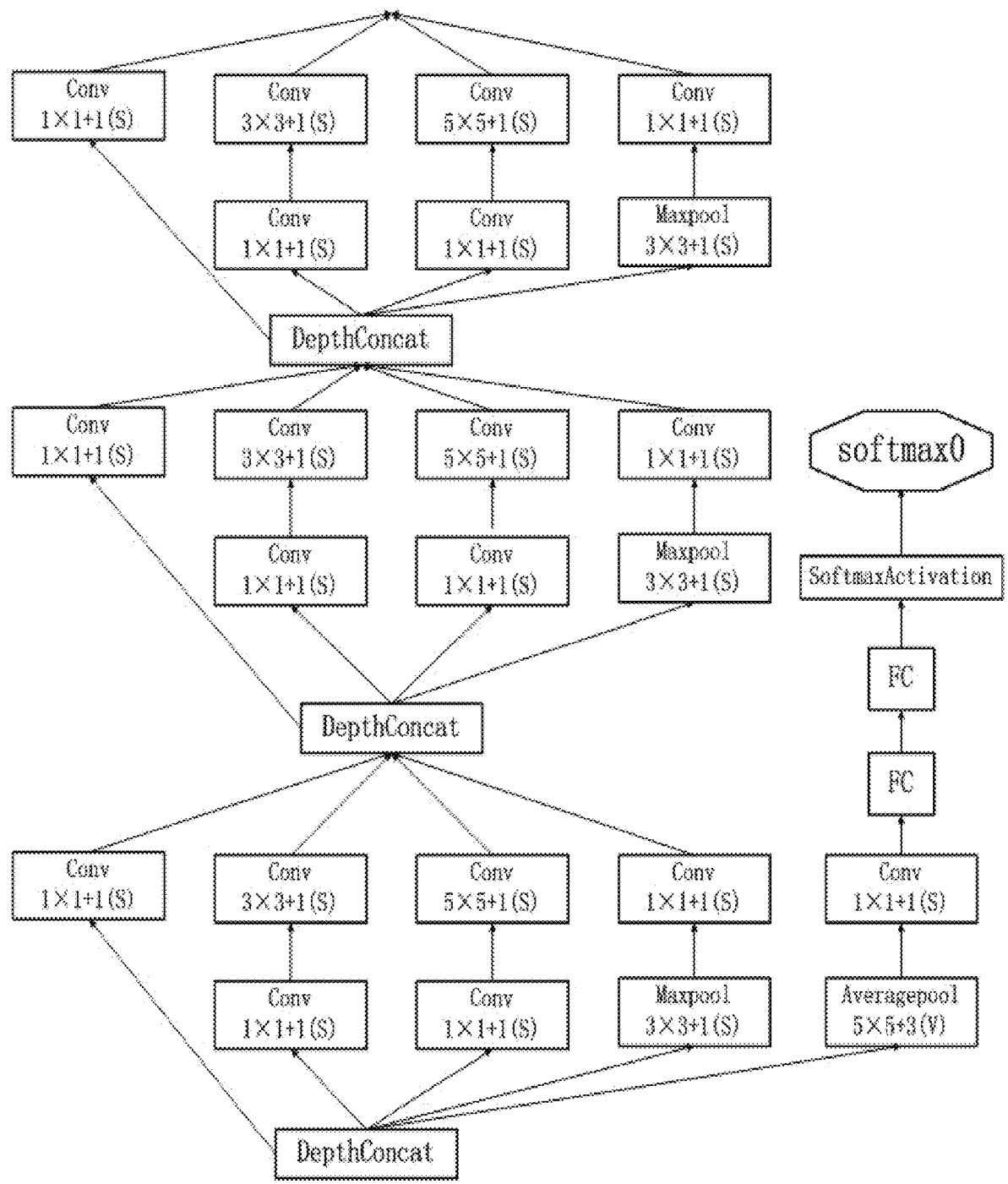
FIG. 6B shows an intermediate step by which data is converted from the input side to the output side.
Figure 6C:
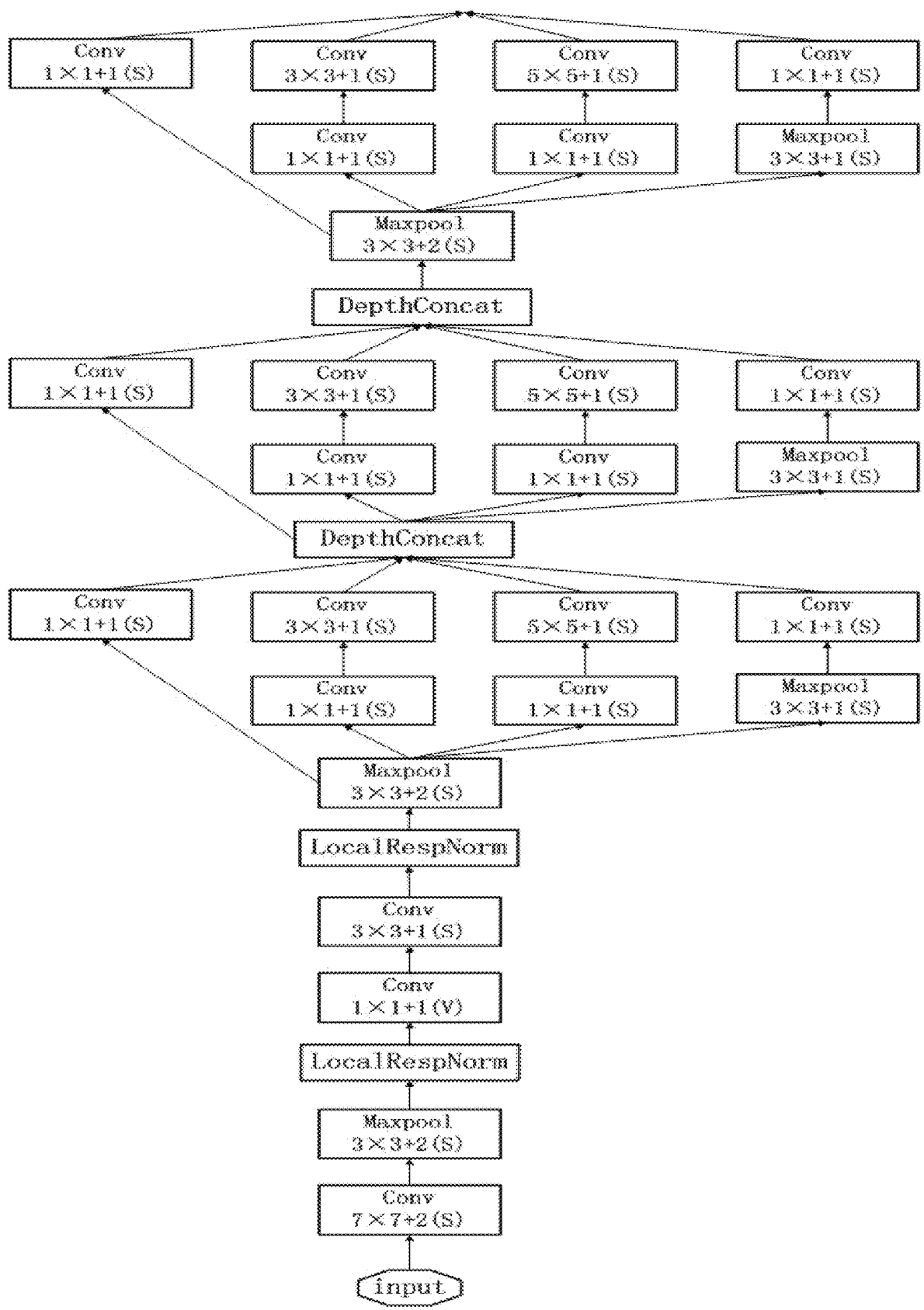
FIG. 6C shows the input side of GoogLeNet.

FIG. 6A though 6C show an example of a complex CNN, GoogLeNet. As shown in FIG. 6A though 6C, GoogLeNet has both serialized connection and parallel connection. FIG. 6C shows the input side of GoogLeNet, FIG. 6A shows the output side of GoogLeNet, and FIG. 6B shows an intermediate step by which data is converted from the input side to the output side. For more information of GoogLeNet, please refer to "Going deeper with convolutions" by Christian Szegedy.

In a complex neural network, e.g., GoogLeNet, concatenation operation is common. It is represented by a CONCAT layer, which concates two or more inputs from preceding layers into one single output. For example, a CONCAT layer has two inputs: input A and input B, input A is a set of feature maps having C1 channels and W*H dimension, input B has a set of feature maps having C2 channels and W*H dimension. After the concatenation, the CONCAT layer outputs a set of feature maps of W*H*(C1+C2).

Figure 7:
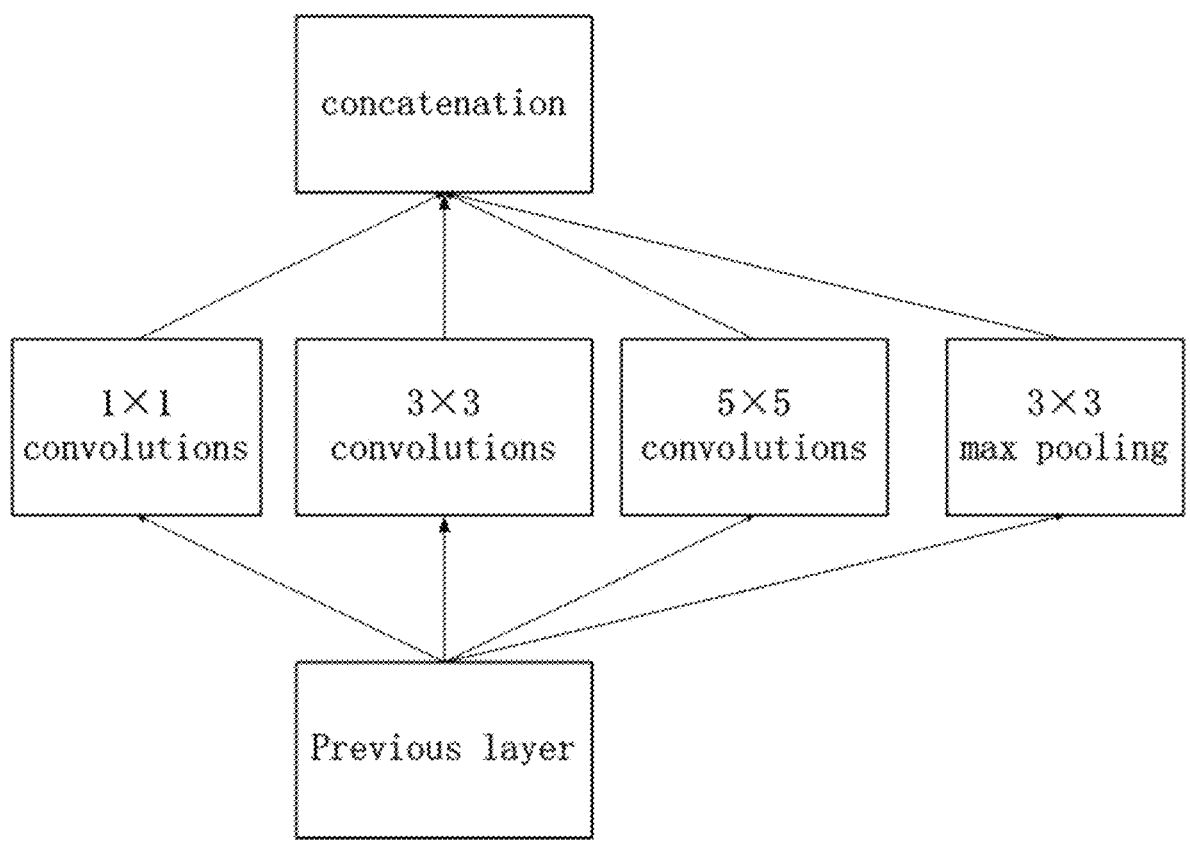
FIG. 7 shows a CONCAT operation in a complex neural network.

FIG. 7 shows an example of CONCAT layer. Said CONCAT layer has four inputs, a 1*1 CONV layer, a 3*3 CONV layer, a 5*5 CONV layer and a 3*3 max-pooling layer. Said CONCAT layer concates said four inputs and provide one output.

Figure 8:
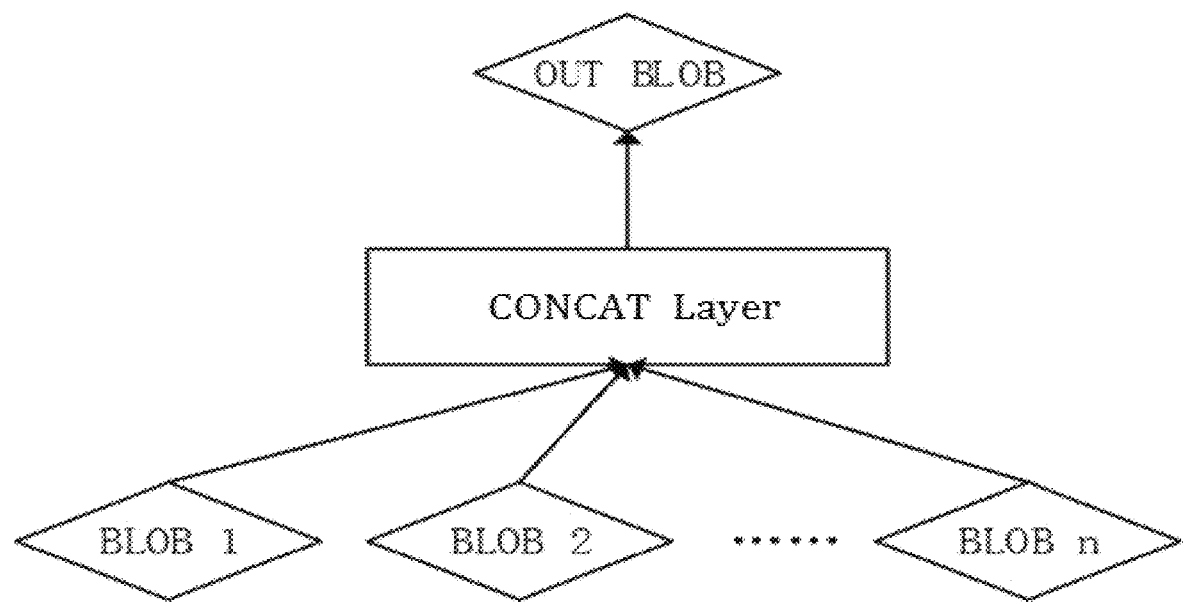
FIG. 8 shows the CONCAT operation from perspective of data structures.

FIG. 8 shows an operation of CONCAT with more details of data structures.

BLOB is binary large object, which is used as a container for binary files. A typical BLOB is used for storing images or voice.

In the present invention, BLOB may be a 4-dimensional data structure, which accommodates the W*H*C feature maps. The preceding level of a CONCAT layer has a plurality of layers, which output BLOB1, BLOB2, . . . , BLOBn respectively to the CONCAT layer. The CONCAT layer concates (or merges) these inputs into one single output BLOB.

In hardware implementation, in order to conduct concatenation/merging operation on BLOB1, BLOB2, . . . BLOBn, it is necessary to change the address of BLOB1, BLOB2, . . . BLOBn in the memory.

When BLOB1, BLOB2, . . . BLOBn are represented by fixed-point numbers, it is likely that different BLOBi have different fixed-point range. However, for the concatenation operation, different fixed-point ranges of the preceding inputs BLOBi may result in a conflict. The CONCAT layer can only choose one of the different fixed-point ranges. Thus, BLOBi of other fixed-point ranges cannot be accurately represented by the CONCAT layer.

Figure 9:
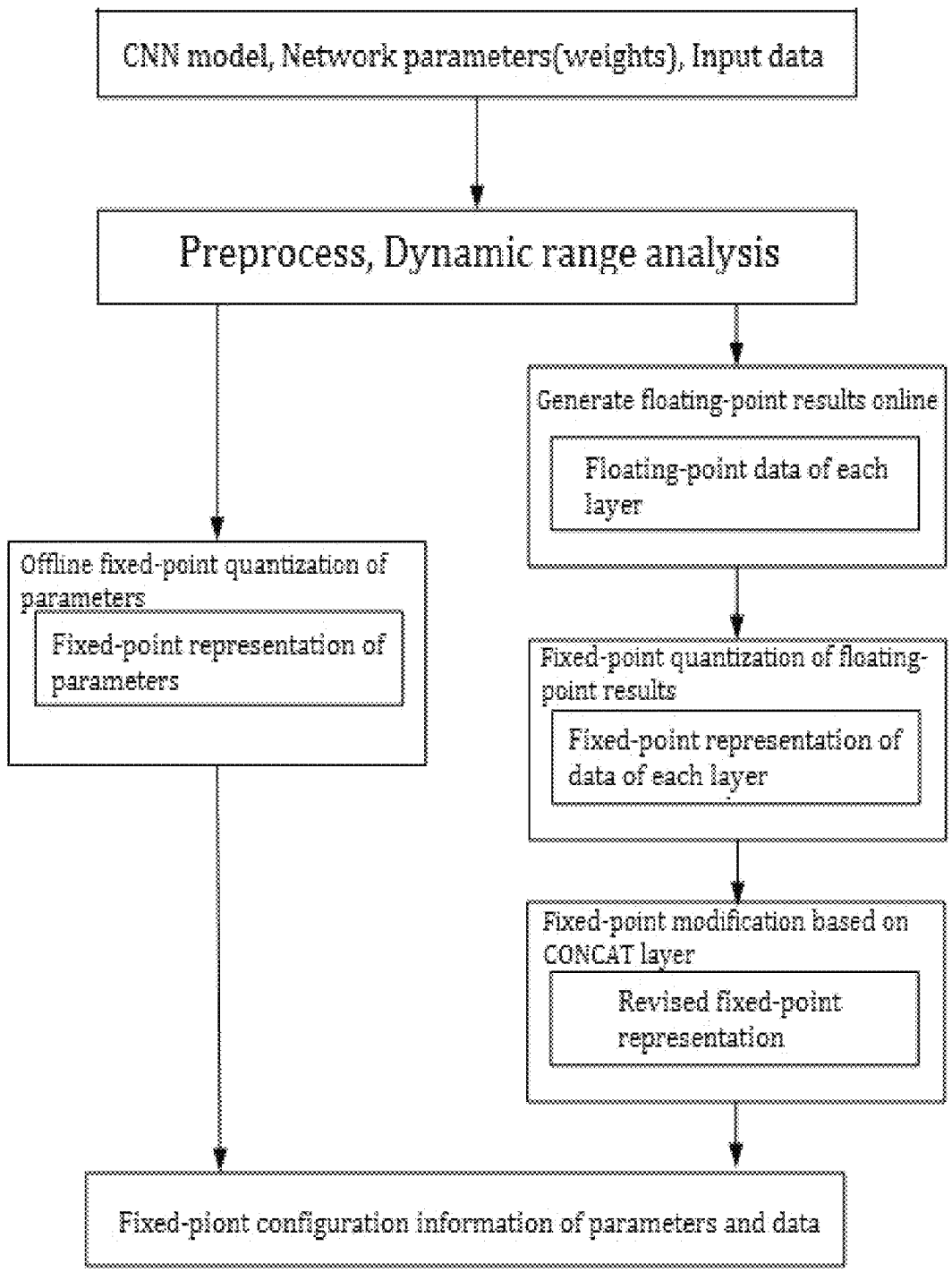
FIG. 9 shows a solution proposed by the present invention in order to quantize a complex CNN.

FIG. 9 shows a new process of data quantization in order to address the above problem.

In the process shown in FIG. 9, the neural network is a complex network with sub-branches, it comprises convolutional layers CONV 1, CONV 2, . . . CONV n, and fully connected layers FC 1, FC 2, . . . , FC m, concatenation layers CONCAT1, CONCAT2, . . . , CONCAT l, wherein n, m and l are positive integers.

The left branch of weight quantization shown in FIG. 9 is similar to that of FIG. 5. FIG. 9 differs from FIG. 5 in the right branch of data quantization. In FIG. 9, it shows a process of data quantization of a complex neural networks.

Firstly, it estimates the numerical range of output of all layers of said neural network, including CONV layers, FC layers, and CONCAT layers. The estimation is conducted by on-line running actual or sample data in the neural network and get the output in floating numbers.

According to one embodiment, said first step comprises: providing input data to said ANN, said input data is processed by said convolutional layers CONV 1, CONV 2, . . . CONV n, and fully connected layers FC 1, FC 2, . . . , FC m, concatenation layers CONCAT1, CONCAT2, . . . , CONCAT l.

Secondly, it converts the output of each layer from floating-number into fixed-numbers.

Specifically, in one embodiment, during converting output of each of said CONV, FC and CONCAT layers from float-point numbers into fixed-point numbers, the numerical range of fixed-point numbers is dynamically chosen for different layers while remains static in one layer.

According to one embodiment of the present invention, it finds the optimal fixed-point range (e.g., $f_l$) for each layer based on the criteria of equation 7 or 8.

Thirdly, it modifies fixed-point range for output of each preceding layer of CONCAT layer on the basis of the fixed-point range of CONCAT layer.

Specifically, in third step, it identifies a CONCAT layer. In other words, it identifies at least one sub-network from said neural network, wherein each sub-network has a CONCAT layer as its output, wherein said CONCAT layer receives at least two outputs of previous-level layers as its inputs and concatenates said inputs into one output.

Next, for each of previous-level layers of said CONCAT layer, it compares each previous-level layer's fixed-point range with said CONCAT layer's fixed-point range. If they are different, adjusting the fixed-point range of said previous-level layer to be same as the fixed-point range of said CONCAT layer.

In addition, according to one embodiment, if one previous-level layer of said CONCAT layer (e.g., CONCAT1) is also a CONCAT layer (e.g., CONCAT2), identifying another sub-network with said CONCAT2 as its output, and conducting third step for said another sub-network.

As shown in the left branch of FIG. 9, it has a weight quantizing step for converting weights of said CONV layers, FC layers and CONCAT layers from float-point numbers into fixed-point numbers.

The left and right branches of FIG. 9 can be conducted in various sequences. For example, they can be performed one after another. Or , they can be performed in an alternative manner.

In one embodiment, before starting data quantization, it conducts weight quantization for all CONV layers, FC layers and CONCAT layers of the neural network.

Or, it conducts the weight quantizing step and data quantizing in an alternative manner. Specifically, after conducting weight quantization for the present layer of said CONV layers, FC layers and CONCAT layers, before conducting weight quantization for next layer of said CONV layers, FC layers and CONCAT layers, it conducts data quantization of the output of said present layer.

In addition, in one embodiment, it outputs the fixed-point number range of each of said CONV layers, FC layers and CONCAT layers said after third step.

Figure 10:
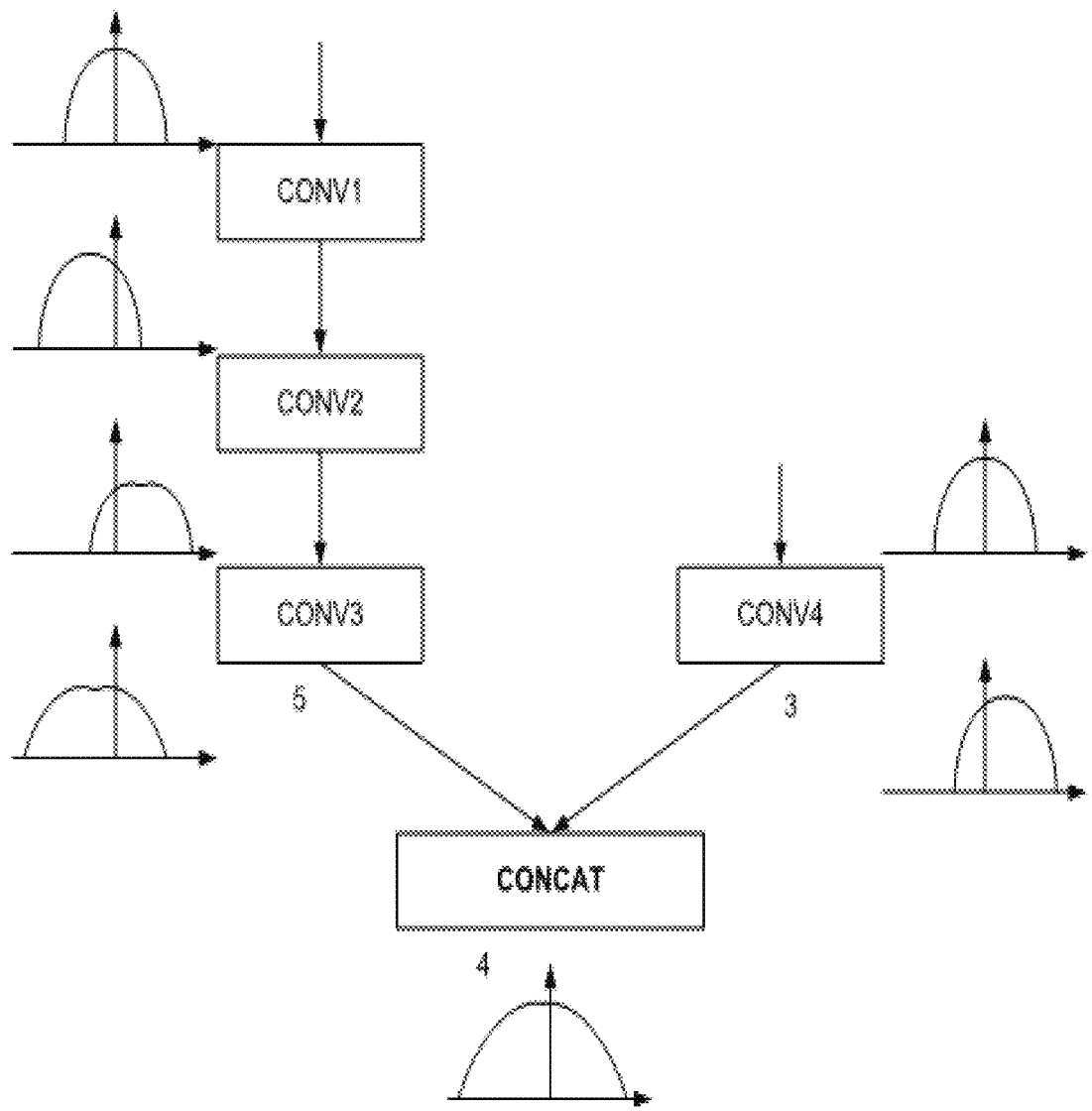
FIG. 10 shows an example of modifying preceding layers' fixed-point quantization on the basis of a CONCAT layer's fixed-point quantization.

FIG. 10 shows a specific example of how to modify preceding layers on the basis of the CONCAT layer's fixed-point range.

In FIG. 10, CONCAT layer has two inputs, which are preceding—level layers CONV3 and CONV4. CONV3 has preceding layer CONV2 as input, and CONV2 has preceding layer CONV1 as input.

Following the process shown in FIG. 9, the first step is to input a data set into the neural network and get output of respective layers. The range of output of each layer is thus obtained, as shown in FIG. 10. In FIG. 10, the output has a Gaussian distribution.

In a second step, it converts the output from floating-point number into fixed-point number. In the example of FIG. 10, it converts float-point number into 8-bit fixed-point number, with the fixed-point representation (4), bw=8. For example, the optimal $f_l$ for CONV3 is 5, the optimal $f_l$ for CONV4 is 3, and the optimal $f_l$ for CONCAT is 4.

In a third step, it modifies the fixed-point ranges of CONV3 and CONV4 on the basis of the fixed-point range of CONCAT layer.

Specifically, it compares the fixed-point range of CONV3 ($f_l$=5) with that of CONCAT ($f_l$=4). As they are different, it modifies the fixed-point range of output of CONV3 as $f_l$=4.

Next, it compares the fixed-point range of CONV4 ($f_l$=3) with that of CONCAT ($f_l$=4). As they are different, it modifies the fixed-point range of output of CONV4 as $f_l$=4.

If the CONCAT layer has other inputs, it modifies them in a similar manner.

In addition, if one preceding input of the CONCAT layer (CONCAT1) is also a CONCAT layer (CONCAT2), it will repeat the process to said preceding CONCAT layer (CONCAT2). Firstly, the CONCAT 2 is taken as an input and modified on the basis of the fixed-point range of CONCAT 1. Next, the modified CONCAT2 is considered as a CON- CAT layer, and all preceding inputs' fixed-point ranges of CONCAT2 are modified on the basis of CONCAT2.

It should be understood that the present application is not limited to a neural network with CONCAT layers. It can be applied to a complex neural network with merging/branching/serializing/parallel structures. The concatenation operation should also be widely interpreted as combining more inputs/branches into one.

Also the term "a plurality of" in the specification and claims refers to "two or more".

Those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality.

In applications according to present application, one element may perform functions of several technical feature recited in claims.

Any reference signs in the claims should not be construed as limiting the scope. The scope and spirit of the present application is defined by the appended claims.

What is claimed is:

1. A method for optimizing an Artificial Neural Network (ANN), said ANN has branches and at least comprises convolutional layers CONV 1, CONV 2, . . . CONV n, and fully connected layers FC 1, FC 2, . . . , FC m, concatenation layers CONCAT1, CONCAT2, . . . , CONCAT L, wherein n, m and L are positive integers, said method comprising:
   a) fixed-point data quantizing step, for converting output of each of said CONV, FC and CONCAT layers into fixed-point numbers;
   b) CONCAT layer identifying step, for identifying at least one sub-network from said ANN, wherein each sub-network has a CONCAT layer as its output, wherein said CONCAT layer receives at least two outputs of previous-level layers as its inputs and concatenates said inputs into one output;
   c) fixed-point modifying step, for each sub-network, modifying the fixed-point range of each output of the previous-level layers of said CONCAT layer on the basis of the fixed-point range of said CONCAT layer.

2. The method of claim 1, wherein step (c) comprises:
for previous-level layers of said CONCAT layer, comparing each previous-level layer's output fixed-point range with said CONCAT layer's output fixed-point range;
if they are different, adjusting the fixed-point range of said previous-level layer's output to be same as the fixed-point range of said CONCAT layer's output.

3. The method of claim 1, wherein step (c) comprises:
if one previous-level layer of said CONCAT layer is another CONCAT layer, identifying another sub-network with said another CONCAT layer as its output, and conducting step (c) for said another sub-network.

4. The method of claim 1, wherein step (a) comprises:
providing input data to said ANN, said input data is processed by said convolutional layers CONV 1, CONV 2, . . . CONV n, and fully connected layers FC 1, FC 2, . . . , FC m, concatenation layers CONCAT1, CONCAT2, . . . , CONCAT L;
converting output of each of said CONV, FC and CONCAT layers from float-point numbers into fixed-point numbers, wherein the numerical range of fixed-point numbers is dynamically chosen for different layers while remains static in one layer.

5. The method of claim 4, wherein the step of converting output of each of said CONV, FC and CONCAT layers from float-point numbers into fixed-point numbers further comprises:

$$y = \sum_{i=0}^{bw-1} B_i \cdot 2^{-f_l} \cdot 2^i$$

using the above expression to denote a fixed-point number y, wherein bw is the bit width of the number, $f_l$ is the fractional length which can be negative fraction;
deciding the optimal $f_l$ for outputs of each of said CONV layers, FC layers and CONCAT layers.

6. The method of claim 5, wherein the step of deciding the optimal $f_l$ comprises:
estimating the floating-number range of output of one layer;
designating an initial value for $f_l$;
searching for an optimal $f_l$ in the adjacent domains of the initial value based on the following calculation:

$$f_l = \underset{f_l}{\operatorname{argmin}} \sum |x^+_{float} - x^+(bw, f_l)|$$

wherein $x^+ = A \cdot x$, A represents the operation applied by one of the CONV layers, FC layers and CONCAT layers of the ANN, x represents the input of one layer, $x^+$ represents the output of said layer.

7. The method of claim 5, wherein the step of deciding the optimal $f_l$ comprises:
estimating the floating-number range of output of one layer;
designating an initial value for $f_l$;
searching for an optimal $f_l$ in the adjacent domains of the initial value based on the following calculation:

$$f_l = \underset{f_l}{\operatorname{argmin}} \sum \left| \sum_N k_i \left| X^+_{float_i} - X^+(bw, f_l)_i \right| \right|$$

wherein $x^+ = A \cdot x$, A represents the operation applied by one of the CONV layers, FC layers and CONCAT layers of the ANN, x represents the input of one layer, x+ represents the output of said layer, i represents one bit of said bw bits, $k_i$ represents the weight of said bit i.

8. The method of claim 1, further comprising:
outputting the fixed-point number range of each of said CONV layers, FC layers and CONCAT layers said after step(c).

9. The method of claim 1, further comprising:
weight quantizing step, for converting weights of said CONV layers, FC layers and CONCAT layers from float-point numbers into fixed-point numbers.

10. The method of claim 9, wherein the weight quantizing step further comprising: dynamically choosing numerical range of fixed-point numbers for different layers while remains static in one layer.

11. The method of claim 10, the step of dynamically choosing numerical range of fixed-point numbers for different layers further comprises:

$$y = \sum_{i=0}^{bw-1} B_i \cdot 2^{-f_l} \cdot 2^i$$

using the above expression to denote a fixed-point number, wherein bw is the bit width of the number, $f_l$ is the fractional length which can be negative fraction;

deciding the optimal $f_l$ for weights in each layer.

12. The method of claim 11, wherein the step of deciding the optimal $f_l$ comprises:

estimating the floating-number range of weights of one layer;

designating an initial value for fl;

searching for an optimal fl in the adjacent domains of the initial value based on the following calculation:

$$f_l = \underset{f_l}{\operatorname{argmin}} \sum |W_{float} - W(bw, f_l)|$$

wherein W is the weight matrix of one layer, W (bw, $f_l$) represents the fixed-point format of W under the given bw and $f_l$.

13. The method of claim 11, wherein the step of deciding the optimal $f_l$ comprises:

estimating the floating-number range of weights of one layer;

designating an initial value for fl;

searching for an optimal fl in the adjacent domains of the initial value based on the following calculation:

$$f_l = \underset{f_l}{\operatorname{argmin}} \sum |\sum k_i |W_{float_i} - W(bw, f_l)_i||$$

wherein W is the weight matrix of one layer, W (bw, $f_l$) represents the fixed-point format of W under the given bw and $f_l$, i represents one bit of said bw bits, $k_i$ represents the weight of said bit i.

14. The method of claim 9, further comprises:
before step (a), conducting weight quantization for all CONV layers, FC layers and CONCAT layers of the ANN.

15. The method of claim 9, further comprises:
conducting the weight quantizing step and said step (a) in an alternative manner, wherein after conducting weight quantization for the present layer of said CONV layers, FC layers and CONCAT layers, before conducting weight quantization for next layer of said CONV layers, FC layers and CONCAT layers, conducting data quantization of the output of said present layer.

16. A device for optimizing an Artificial Neural Network (ANN), said ANN has branches and at least comprises convolutional layers CONV 1, CONV 2, ... CONV n, and fully connected layers FC 1, FC 2, ..., FC m, concatenation layers CONCAT1, CONCAT2, ..., CONCAT L, wherein n, m and L are positive integers, said device comprising:

fixed-point data quantizing unit, configured for converting output of each of said CONV, FC and CONCAT layers into fixed-point numbers;

CONCAT layer identifying unit, configured for identifying at least one sub-network from said ANN, wherein each sub-network has a CONCAT layer as its output, wherein said CONCAT layer receives at least two outputs of previous-level layers as its inputs and concatenates said inputs into one output;

fixed-point modifying unit, configured for, for each sub-network, modifying the fixed-point range of each output of the previous-level layers of said CONCAT layer on the basis of the fixed-point range of said CONCAT layer.

17. The device of claim 16, wherein the fixed-point modifying unit is configured to:

for previous-level layers of said CONCAT layer, compare each previous-level layer's output fixed-point range with said CONCAT layer's output fixed-point range;

if they are different, adjust the fixed-point range of said previous-level layer's ouput to be same as the fixed-point range of said CONCAT layer's output.

18. The device of claim 16, wherein
the fixed-point modifying unit is configured to, if one previous-level layer of said CONCAT layer is also a CONCAT layer, identify another sub-network with said preceding CONCAT layer as its output, and
said fixed-point modifying unit is configured to modify said another sub-network.

19. The device of claim 16, wherein the fixed-point data quantizing unit is configured to:

provide input data to said ANN, said input data is processed by said convolutional layers CONV 1, CONV 2, ... CONV n, and fully connected layers FC 1, FC 2, ..., FC m, concatenation layers CONCAT1, CONCAT2, ..., CONCAT L, convert output of each of said CONV, FC and CONCAT layers from float-point numbers into fixed-point numbers, wherein the numerical range of fixed-point numbers is dynamically chosen for different layers while remains static in one layer.

20. The device of claim 16, further comprising: weight quantizing unit, being configured for converting weights of said CONV layers, FC layers and CONCAT layers from float-point numbers into fixed-point numbers.

21. A method for optimizing an Artificial Neural Network (ANN), said method comprising:

a) fixed-point data quantizing step, for converting output of each layer of said ANN into fixed-point numbers, b) sub-network identifying step, for identifying at least one sub-network from said ANN, said sub-network has a concatenation layer as its output, wherein said concatenation layer receives at least two outputs of previous-level layers as its inputs and concatenates said inputs into one output;

c) fixed-point modifying step, for each sub-network, modifying the fixed-point range of each output of the previous-level layers of said concatenation layer on the basis of the fixed-point range of said concatenation layer.

22. The method of claim 21, wherein step (c) comprises:
for previous-level layers of said concatenation layer, comparing each previous-level layer's output fixed-point range with said concatenation layer's output fixed-point range, if they are different, adjusting the fixed-point range of said previous-level layer's output to be same as the fixed-point range of said concatenation layer's output.

23. The method of claim 21, wherein step (c) comprises:
if one previous-level layer of said concatenation layer is also a concatenation layer, identifying another sub-network with said preceding concatenation layer as its output, and conducting step (c) for said another sub-network.

24. The method of claim 21, wherein said ANN has branches and at least comprises convolutional layers CONV 1, CONV 2, . . . CONV n, and fully connected layers FC 1, FC 2, . . . , FC m, concatenation layers CONCAT1, CONCAT2, . . . , CONCAT L, wherein n, m and L are positive integers.

25. The method of claim 24, step (a) further comprising:
providing input data to said ANN, said input data is processed by said convolutional layers CONV 1, CONV 2, . . . CONV n, and fully connected layers FC 1, FC 2, . . . , FC m, concatenation layers CONCAT1, CONCAT2, . . . , CONCAT L,
converting output of each of said CONV, FC and CONCAT layers from float-point numbers into fixed-point numbers, wherein the numerical range of fixed-point numbers is dynamically chosen for different layers while remains static in one layer.

\* \* \* \* \*